Aug. 27, 1935. O. A. CAVINS Re. 19,679

BAILER

Original Filed Nov. 14, 1930 4 Sheets-Sheet 1

Inventor

Omar A. Cavins

By Lyon & Lyon

Attorneys

Aug. 27, 1935. O. A. CAVINS Re. 19,679

BAILER

Original Filed Nov. 14, 1930 4 Sheets-Sheet 2

Inventor:

Omar A. Cavins

By Lyon & Lyon

Attorneys

Inventor
Omar A. Cavins
By Lyon & Lyon
Attorneys

Inventor
Omar A. Cavins
By Lyon & Lyon
Attorneys

Reissued Aug. 27, 1935 Re. 19,679

UNITED STATES PATENT OFFICE 19,679

BAILER

Omar A. Cavins, Oakland, Calif.

Original No. 1,917,211, dated July 4, 1933, Serial No. 495,699, November 14, 1930. Application for reissue June 14, 1934, Serial No. 730,681

63 Claims. (Cl. 166—19)

This invention relates to bailers or clean-out tools such as used for bailing sand from deep wells. While features of the invention may be employed in bailers operating in shallow wells, the invention is particularly adapted for use in connection with deep wells where pressure exists at the well bottom, due to the head of liquid in the well.

The general object of this invention is to provide a simple apparatus for effecting the automatic loading of the sand chamber of the bailer from an obstruction, such as sand, in a well; also for effecting the discharge of the sand chamber after the withdrawal of the bailer from the mouth of the well.

A further object of the invention is to improve the general construction of bailers.

In addition to these general objects provided for by all embodiments of this invention, each construction provides for objects different from or in addition to the other embodiments.

These further objects of the invention will appear hereinafter.

The invention consists in the novel parts and combinations of parts to be described hereinafter, all of which contribute to produce an efficient bailer.

A preferred embodiment of the invention is described in the following specification, while the broad scope of the invention is pointed out in the appended claims.

In the drawings:—

Figure 6 is a longitudinal section taken between the points 6—6 of Figure 5 but in a plane parallel with the plane in which Figure 5 is taken; this shows the details of the self-contained balanced flow control valve assembly.

Figure 7:
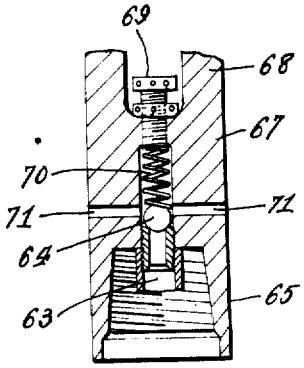

Figure 7 is a vertical section taken on the line 7—7 of Figure 5 and particularly illustrating a relief valve, which may be employed for relieving the pressure of the retained gas; this gas is utilized in ejecting the load from the sand chamber, and this view illustrates a small tube below the relief valve to provide for the retention of gas in the upper part of the suction chamber for use in ejecting the load from the sand chamber.

Figure 6:
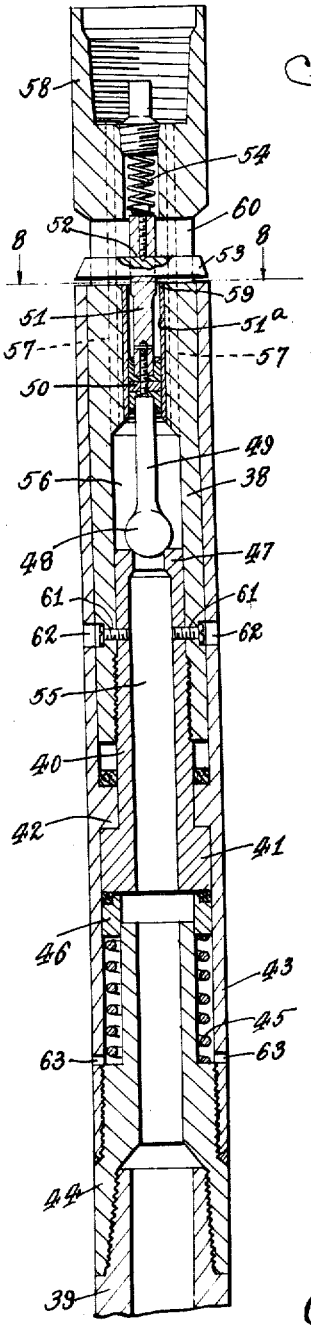
Figure 8:
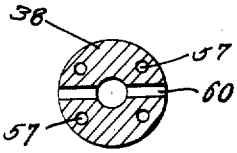

Figure 8 is a cross-section taken on the line 8—8 of Figure 6 through the casing of the bailer, the other parts being removed.

Figure 9:
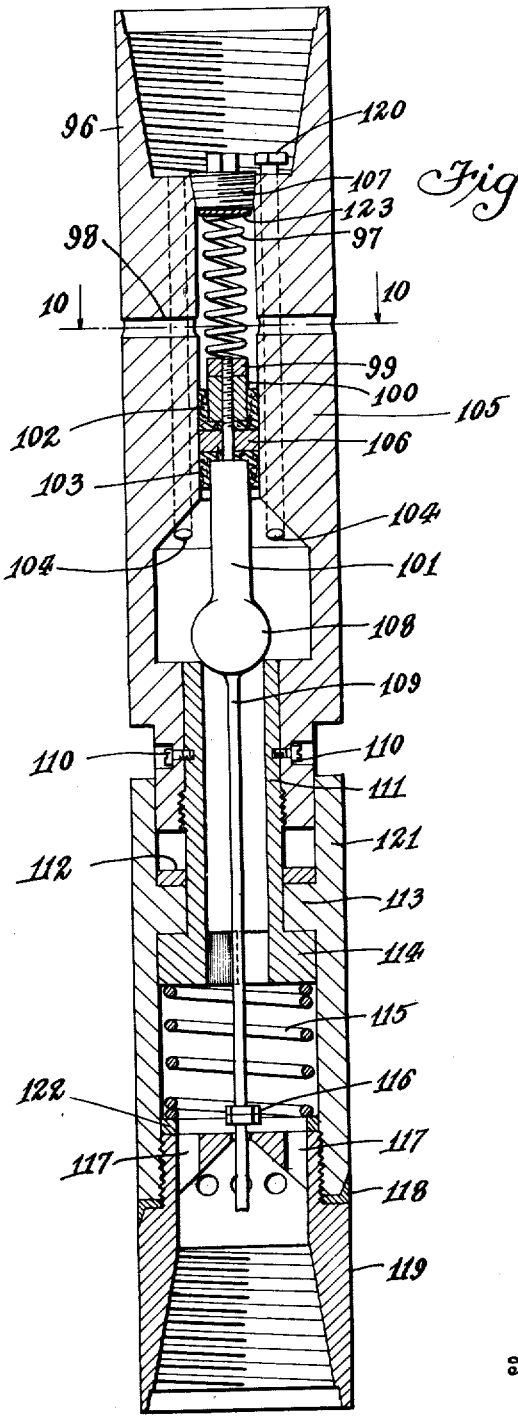

Figure 9 is a longitudinal section of another construction of the self-contained balanced flow control valve assembly to be used in a bailer, and embodying my invention.

Figure 10:
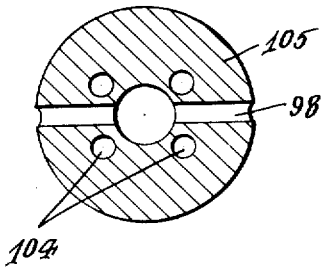

Figure 10 is a cross-section taken on the line 10—10 of Figure 9 through the casing of the bailer, the other parts being removed.

Figure 11:
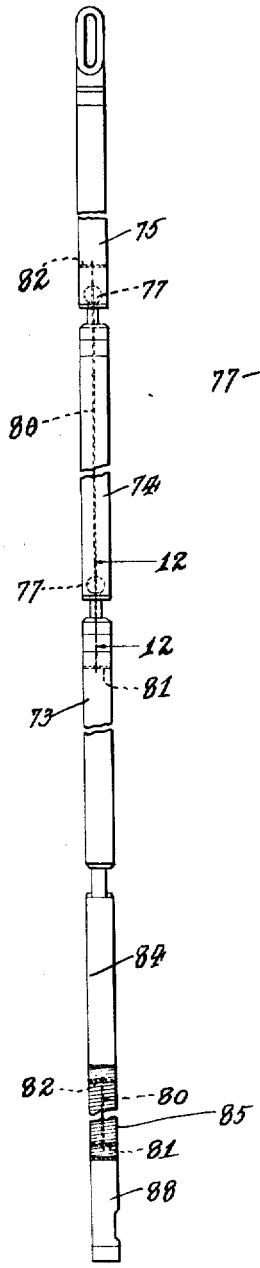

Figure 11 is a side elevation of a complete bailer embodying my invention and having special features of construction adapting it to be used in a crooked hole, certain parts being broken away.

Figure 12:
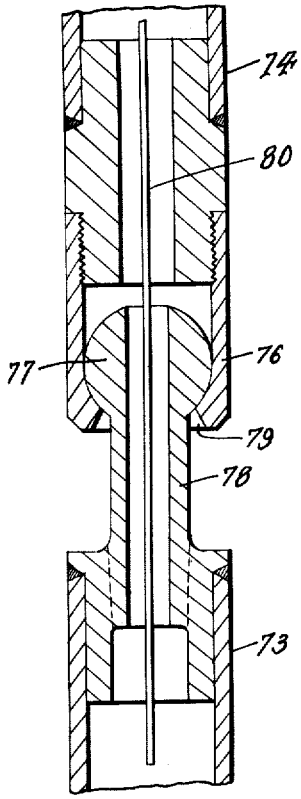

Figure 12 is a vertical section through this bailer taken on the axis of Figure 11 between the lines 12—12. This view is upon an enlarged scale.

Figure 13:
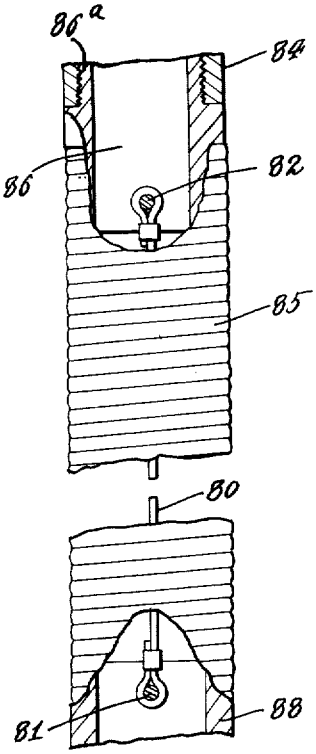

Figure 13 is a side elevation partially broken away and illustrating the anchorages for the tie which I prefer to employ in this type of bailer.

Before proceeding to a detailed description of the invention it should be understood that according to my method I drop the bailer upon the obstruction to be removed from the well, thereby opening the suction chamber, containing air, gas or both at low pressure, to the sand chamber, thereby enabling the higher pressure in the well to effect the automatic loading of the sand chamber due to the equalization of the well pressure with the suction chamber pressure. Furthermore, I prefer to retain all or a part of the entrapped gas or air pressure and utilize it at the mouth of the well for discharging the bailer.

The apparatus for effecting this mode of operation may take various forms. In the present specification I have described two embodiments of the invention, in one of which I employ a valve at the upper end of the sand chamber which is opened automatically by the arrest of the downward movement of the bailer striking the bottom of the well. In one type, I provide automatic means for latching this valve in its open position. The sudden opening of this passage into the upper or suction chamber causes the well pressure to quickly charge the bailing chamber or sand chamber of the bailer. In all the embodiments of this invention, the movement of the valve toward its open position is slightly delayed when the bailer shoe strikes the well bottom. This permits time for the shoe to bite into the well bottom.

Through the action of a flap valve at the bottom inlet of the bailer, the charge is retained under pressure. I also use the pressure chamber for retaining the compressed gas which becomes trapped in the upper end of the pressure or suction chamber. If desired, this may be retained at a somewhat reduced pressure. After the loaded bailer is withdrawn from the mouth of the well, I open the bottom end of the bailer, preferably by opening its side, whereupon the pressure in the pressure chamber effects the quick discharge of the bailer's load.

In another embodiment of the invention described in this specification, I mount the suction chamber so that it is capable of a limited downward movement relative to the sand chamber when it strikes an obstruction, and I utilize this downward movement or relative upward movement of the sand chamber with respect to the casing to effect the opening of the valve above the sand chamber, thereby permitting the equalization of the well pressure into the pressure chamber and effecting the loading of the bailer.

In situations where the bailer must operate in a crooked hole, I provide a special construction in which the bailer is composed of sections connected together by flexible joints.

Figure 1:
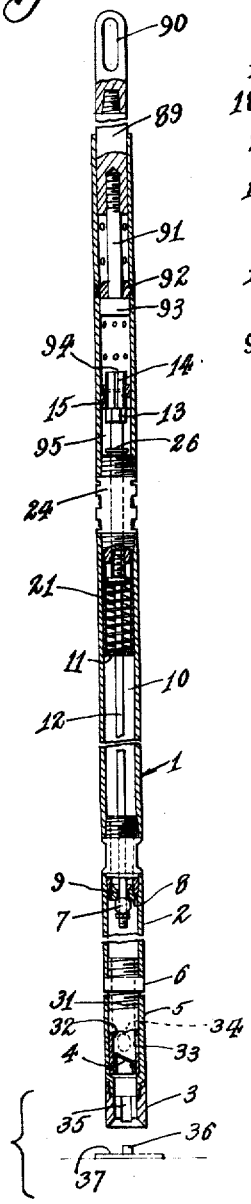
Figure 1 is a longitudinal section with certain parts broken away illustrating an embodiment of my invention.
Figure 4:
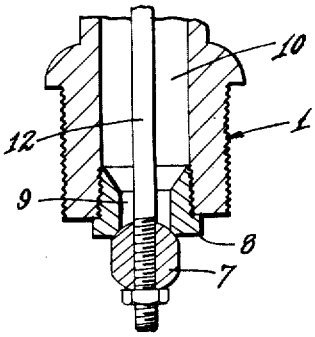
Figure 4 is a vertical section upon an enlarged scale taken at the valve, which is located at the upper end of the sand chamber of the assembled bailer.

Referring particularly to Figures 1 and 4 which illustrate one of the embodiments of my invention, 1 indicates generally the casing of the apparatus, said casing having a sand chamber 2 at its lower end constructed so as to receive the charge when the bailer is dropped upon the obstruction in the well. For this purpose, the lower end of the sand chamber 2 is provided with a shoe 3 above which retaining means for the charge is provided, preferably in the form of an inclined flap valve 4 of common type. This shoe 3 carries a sleeve 5 which is threaded and rotatable on a union 6 for a purpose which will appear hereinafter.

At the upper end of the sand chamber I provide a valve means, preferably including a ball valve 7 received on a valve seat in the form of a bushing 8 having a valve passage 9 through it. Above this point within the casing 1 an air chamber or pressure chamber 10 is provided, near the upper end of which is located a fixed spring seat and guide 11 through which a valve stem 12 passes upwardly from the ball 7 which is carried on the lower end of the stem. The upper end of this valve stem 12 extends upwardly in the casing and carries an extension or polished rod with a head 13 (see Figure 2). The upper face of this polished rod head lies adjacent to the lower end of a latching block 14. Within the casing at this point a bushing 15 is provided having a longitudinal slot 16 at one side in which travels a fixed stop 17 that limits the upward movement of the block in the bushing. The upper portion of the block is provided with a sliding latch bolt 18 that has a rounded nose 19 at one side to cooperate with the cam face 20 on the adjacent side of the bushing. When the bailer lands at the bottom of the well the momentum of this block 14, augmented by the momentum of other downwardly moving parts, causes it to move the valve stem 12 downwardly, thereby effecting the opening of the valve against the action of its coil spring 21 that seats on the fixed guide 11 (see Figure 1). When the valve 7 under downward thrust of valve stem 12 opens, the well pressure in the sand chamber causes a rush of liquid and compressed gas into the pressure chamber 10, thus loading the sand chamber with the material upon which the shoe of bailer has struck.

Figure 2:
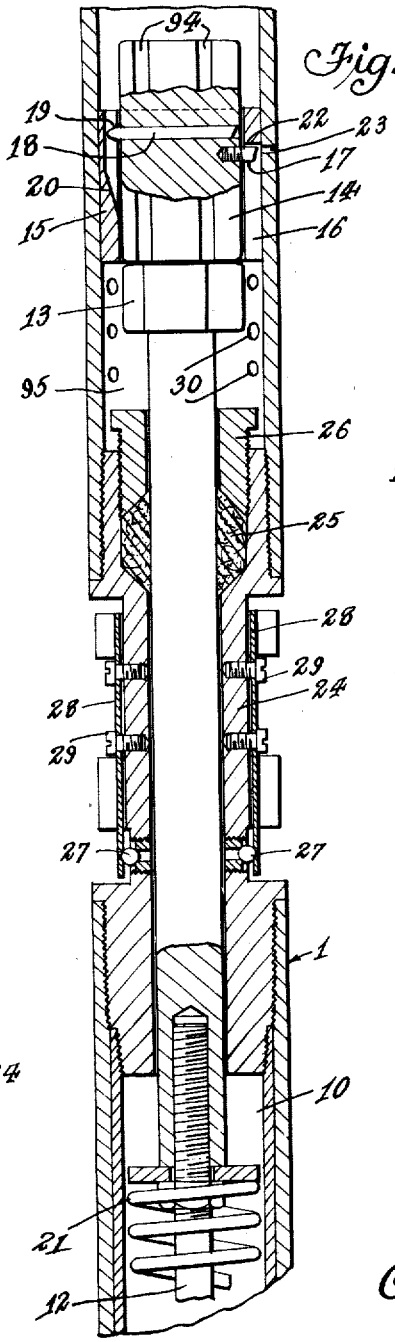
Figure 2 is a section upon an enlarged scale showing some of the parts illustrated in Figure 1, and particularly illustrating the means for latching the valve in its open position together with one of the means which may be employed for reducing the pressure in the apparatus.
Figure 3:
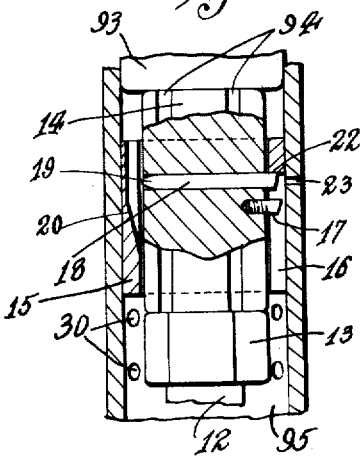
Figure 3 is a section showing the same parts illustrated at the upper end of Figure 2 but representing them in the latching position in which the valve is held open.

The cam face 20 operates to slide the bolt 18 toward the right, as viewed in Figures 2 and 3, causing its right end to latch under the face or shoulder 22 of the bushing, thereby latching the block as indicated in Figure 3. When it is desired to restore the block to its normal position, this can be effected by inserting a pin through the opening 23 in the casing wall; this opening is in alignment with the latch bolt 18 when in its latched position.

I provide means for retaining the pressure in the pressure chamber 10 and sand chamber but I prefer to provide means for relieving this pressure somewhat. For this purpose, I provide a guide connection 24 which forms a part of the casing, the upper end of which is formed into a stuffing box 25 with packing which may be compressed by a gland 26. This packs off the polished rod at this point. This guide 24 may be provided with one or more relief valves 27 held on their seats by a spring or springs 28, and screws 29; the force of these springs can be adjusted by obvious means.

In order to facilitate the drainage and cleaning of objectionable sand from this part of the interior of the casing, I may provide the casing wall, wherever necessary, with wash holes or perforations 30 (see Figure 2).

Referring again to the shoe 3 at the bottom of the bailer and also to the sleeve 5 that carries this shoe, I shall now describe the preferred means for opening the lower end of the bailer to effect this discharge at the mouth of the well. For this purpose the sleeve 5 is made readily rotatable in its threaded connection 31 with the union 6. The union 6 has a sleeve 32 that projects down from the same and is provided on one side with an opening or port 33. The sleeve 5 has a similar port 34 that may align with the port 33. In Figure 1 these ports are shown out of alignment with each other which is the relation that they have when the bailer goes down into the well. When the loaded bailer reaches the mouth of the well it can be readily discharged by rotating the sleeve 5 to bring the opening 34 into alignment with the opening 33. Any suitable means may be provided for this purpose. If desired, the bore of the shoe 3 may be provided with diametrically opposite slots 35 to receive the ends of a diametrical bar 36 projecting up from a floor plate 37 that may be secured to the floor of the derrick. The bailer may be lowered down onto this plate and then rotated by hand so as to bring the ports 33 and 34 into alignment as suggested. When this is done, the compressed air or gas in pressure chamber 10 and load chamber 2 will quickly effect the discharge of the bailer. In this operation the inclination of the flap valve 4 cooperates. It is preferably located so that the discharge port 33 is adjacent its lower side.

Figure 5:
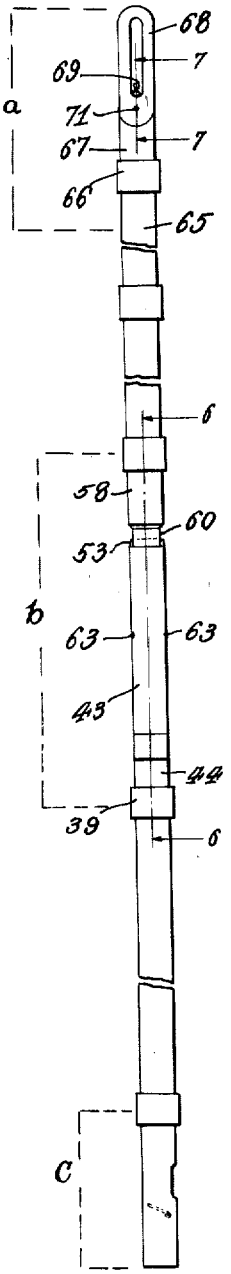
Figure 5 is a side elevation of a complete bailer outfit (with certain parts broken away) illustrating another embodiment of my invention.

Referring to Figures 5 and 6 which with Figures 7 and 8 depict one construction of the second embodiment of the bailer in this type, the working parts of the bailer, for ease of transportation and simplicity of operation are concentrated into three relatively small units (*a*) bailer suspension consisting of combined ball and pop valve, (*b*) self-contained balanced flow control valve assembly, and (*c*) bottom valve. With these three parts and suitable tubing, the complete bailer is assembled. The casing 38 of the bailer is constructed so as to guide the sand chamber 39 for vertical movement. For this purpose the lower end of the casing is provided with a tubular extension 40 with an enlarged collar 41 at its lower end. This collar acts as a stop for the corresponding shoulder 42 on the inner side of a sleeve 43, the lower end of which is attached to a coupling head 44 that carries the sand chamber attached below.

Between the coupling head and the collar 41 a coil spring 45 is provided that normally holds the ball valve 48 on its seat 47. The upper end of this spring exerts its pressure against a packing ring 46. The upper end of the extension 40 carries a valve seat 47 with which cooperates a ball valve 48 having a stem 49 that extends upwardly and carries a head 50 guided to slide in a bore having a liner 51a preferably of bronze and mounted in the casing 38. The piston head 50 is carried between the stem 49 and a plunger 51 having a transverse slot 52 through which an actuating key or crosshead 53 projects, the ends of the said crosshead being equally distant from, and slightly above, the upper end of the sleeve 43, at diametrically opposite points. With this arrangement, when the lower end of the bailer strikes the obstruction in the well, the spring 45 will be compressed and the upper end of the sleeve will strike the crosshead 53 and stop the downward movement of valve 48, while seat 47 continues downwardly, thus opening the valve by pulling the ball off of its seat.

In doing this, the spring 54 mounted in the upper end of the casing is compressed and will return the valve 48 to its seat when the bailer is lifted after loading. The result of opening valve 48, as described, will be that the pressure communicated through the sand chamber from the well liquid to the under side of the valve 48 will be suddenly relieved, thereby permitting the sand chamber to load itself as described in connection with the first type (Figure 1). Above the valve seat 47 an upper valve chamber 56 is formed into which the released pressure passes from the lower flow duct 55 and the pressure from this chamber is relieved through longitudinal flow ducts 57 that pass up to the upper end of the casing and through the end wall of the threaded bushing 58 which is provided for connecting on the upper, or pressure, chamber section of the bailer.

The upper end of the liner 51a forms an annular passage 59 preferably of the same area as flow area of the valve seat 47, which admits the pressure in the well to the upper side of the head 50. This is substantially equal to the pressure on the lower side of valve 48 and enables the spring 54 to hold the valve on its seat until the bailer reaches the obstruction or the bottom of the well. The retained pressure in the pressure chamber is in this way also equalized on the lower side of the head 50 and upper side of valve 48 so that there is no undue strain on any part of the valve mechanism from time of loading to time of dumping the bailer. The valve 48 acts as a pop valve when bailer is being withdrawn from the well, permitting most of the trapped pressure in the sand chamber to discharge into the pressure chamber, as pressure on the latter is reduced by its relief valve. The crosshead 53 is mounted in a transverse slot 60 formed diametrically through the casing.

For securing the extension 40 in the lower end of the casing, removable set screws 61 may be provided which are accessible through aligning openings 62 in the wall of the shell or sleeve 43.

With this type of bailer illustrated in Figure 6, the valve is not held in its open position after loading in a well, but after the bailer is brought to the mouth of the well its discharge opening can be opened and bailer discharged by setting on the floor, thereby opening valve 48 and permitting the pressure retained in the pressure chamber to discharge the contents of the load chamber.

If desired, a relief valve 64 may be provided at the upper end of the enclosed space in the upper section 65 of the bailer, said upper section 65 being connected through a union 66 with a head 67 in which the valve 64 is mounted. This head 67 may carry the bail 68 of the bailer to which the sand line is attached and in this bail an adjustable set screw 69 may be provided for regulating the force of the valve spring 70 that holds the valve on its seat. When the valve opens the pressure is relieved through diametrically disposed ports 71 in this head 67.

The tube 63, Figure 7, extends downwardly into and for a considerable length of the pressure chamber. This forms a gas trap in the space surrounding the tube so that gas under pressure is retained in the upper part of the pressure chamber to provide an expansive force to be used in discharging the load chamber of the bailer at the mouth of the well.

Referring to Figures 9 and 10 which show another construction of the self-contained balanced flow control valve assembly of one embodiment of the bailer, the bailer telescopes to some extent in this construction, the casing 105 moving downward relative to the sleeve 121 when the bailer stops on an obstruction in the well. The tubular extension 111 with the enlarged collar 114 at its lower end is engaged under the shoulder 113 of the sleeve 121. With the telescoping of this section, the upper surface of shoulder 113 pushes the packing ring 112 into contact with the lower end of the casing 105, and the push rod 109 lifts the ball valve 108 from its seat, compressing spring 97; as illustrated, this push rod is attached to the ball. The thickness of the washer 123 governs the compression of spring 97 when the valve is in its closed position. The piston head assembly composed of packing 102, flow ducts 104, washer 105, nut 100 and lock nut 99 and balancing rod 101 attached to the ball 108, exerts, because of the liquid pressure entering at 98, a balancing pressure on the ball valve 108.

The compressed spring 115 tends to extend the bailer and prevent telescoping. The spring 115 is held in compression by the coupling head 119 which carries the sand chamber below, the washer 122 which is interchangeable with thicker or thinner ones to regulate the amount of compression of spring 115. The lock washer 118 guards against loss of the coupling head and sand chamber in the well. The lower end of the flow duct in the tubular extension 111 is shaped to engage a special wrench so that the tubular extension 111 can be easily screwed into the lower end of the casing 105. The machine screws 110 guard against unscrewing. The flow area from the sand chamber to the suction chamber is regulated by plugging one or more of the casing flow ducts 104 with a suitable plug 120 or plugs which can be retained in place by threading into the flow ducts or by the threaded tubing which, entering the box 96, will hold the plug 120 in place. This enables the charging of the bailer to be regulated.

When it is desired to use my bailer in a crooked hole, the bailer is preferably formed of sections 73, 74 and 75 (see Figure 11). These sections are connected together by a flexible joint preferably having the characteristics of construction illustrated in Figure 12, that is to say, each relatively upper section is provided with a socket 76 carrying a ball head 77 formed on the upper end of a tubular neck 78, the lower end of the said neck being enlarged into a head welded into the upper end of the lower section.

The lower end of the socket 76 has openings 79 of considerably larger diameter than the neck 78 which permits a considerable angular movement of the connected sections.

In order to prevent any possibility of losing the lower end of the bailer in case these flexible joints should break, I prefer to provide a tie wire 80 that extends up from the lower section 73 and passes through the bores of the necks 78 of the flexible joints. In other words, the lower end of this tie wire is anchored to a cross pin 81 on the bottom section 73 and the upper end is anchored to a similar cross pin 82 in the uppermost section 75. By reason of this tie wire 80 it will be evident that if either of the joints fails, the tie wire will maintain a connection to the sand chamber and avoid the necessity for a fishing operation.

The load chamber 85 (see Figure 11) is formed of flexible armour hose. The upper end of this hose is rigidly secured to the lower end of the section 84 and the lower end rigidly secured to the upper end of the bailer shoe. If desired, the load chamber may be safe-guarded against loss by employing a tie wire 80, the ends of which are connected to cross pins 82, already described in connection with the upper end of the bailer. The details of this construction are illustrated in Figure 13.

The upper end of the armour sleeve 85 may be provided with an inserted sleeve 86 carrying the pin 82 and threaded pin 86a to attach to the lower end of the section 84. The lower pin 81 is anchored in the shoe section 88 of the bailing chamber (see Figure 13). In a modification of this crooked hole type of bailer, a flexible joint similar to that shown in Figure 12 joins the load chamber of conventional rigid design to the lower section 84 of the bailer casing.

Referring again to Figure 1, it should be understood that in the operation of the bailer the momentum of the block 14 and the valve stem 12 may be sufficient to effect the opening of the valve, but if it is desired to increase the force to open the valve, this may be accomplished by utilizing the momentum of the upper end section 89 of the bailer (see Figure 1). This end section that carries the bail 90 for the bailing cable is mounted so that it is capable of sliding downwardly in the tubular shell of the casing 1 at this point.

In order to anchor this section 89, its lower end is provided with a stem 91 that slides freely downwardly through a fixed head 92 welded into the tubular casing. The lower end of this stem carries a hammer head 93. With this arrangement it will be evident that, when the bailer strikes the bottom of the well, the momentum of the upper section 89 of the bailer causes it to continue its downward motion, thereby causing the stem 91 to slide through the guide head 92, and cause the hammer head 93 to strike the upper end of the block 14.

This will give a blow to the block 14 which then operates as an anvil, having its own momentum increased by the blow. This will insure the opening of the valve 7. The block 14 may be provided with side grooves 94 to assist in equalizing the pressure in the chamber 95 below the bushing 15, and to prevent binding due to sand or other material carried by the well fluid.

In connection with these descriptions, it should be understood that by reference to gas that any well gas, air or a mixture of both is intended. By sand is meant sand, gravel, mud or other accumulation of more or less finely divided material accumulated in and obstructing or filling part of the well bore. By well is meant a bore hole of any description penetrating the earth.

The mode of operation of the two types of my bailer illustrated above will now be described. In the type illustrated in Figure 1, when the bailer is dropped down the well the block 14 is in the position indicated in Figure 2 and the valve 7 is closed. When the bailer strikes an obstruction of sand in the well the bailer shoe cuts into the solid accumulation of sand; the subsequent sudden reduction of pressure in the sand chamber causes the higher well pressure to inject the sand into the bailer.

The momentum of the block 14 effects the opening of the valve 7 through the agency of the stem 12 and the cam face 20 operates the latch bolt 18 to lock the block 14 in a depressed position, thereby holding the valve open. This permits the gas and liquid and possibly some of the sand to pass up into the pressure chamber 10 below the fixed head 11. The pressure in this chamber may be relieved through the relief valves 27. After the bailer arrives at the mouth of the well the shoe 3 may be set over the plate 37 to enable the bar 36 to engage the slots 35, whereupon the rotation of the sand barrel will bring the opening 34 into alignment with the opening 33, and when this occurs, the pressure in the pressure chamber 10 and load chamber 2 will quickly discharge the load from the sand barrel.

In order to close the valve, before again lowering the bailer into the well, the workman should then drive a pin through the opening 23 to release the latch bolt 18, whereupon the spring 21 will return the valve to its closed position.

In the type shown in Figure 5, using the self-contained balance flow valve assembly detailed in Figure 6, when the lower end of the sand barrel strikes the obstruction in the well, the sand barrel is shifted upward relative to the pressure chamber, compressing spring 45, and causing the sleeve 43 at its upper end to strike the ends of the crosshead 50, thereby pulling up on plunger 51 and opening the valve 48 through the agency of its stem 49.

Before this occurs, however, the pressure in the well will have been communicated to the interior of the sand chamber and under the valve 48 so that when this valve is opened the relief of pressure through the valve opening 47 will cause the sand barrel to start to fill immediately through the action of the pressure in the well.

In the type exactly like that shown in Figure 5, but using the self-contained balanced flow control valve assembly detailed in Figure 9, when the shoe of the bailer strikes the obstruction in the well the sand barrel is shifted upwardly relative to the pressure chamber, compressing the spring 115 (Figure 9) and causing the push rod 109 to push the valve 108 off of its seat against the compression of spring 97, and thus permitting the gas and fluid under pressure in the sand chamber to enter the pressure chamber and so drawing sand into the sand chamber of the bailer.

At the mouth of the well, the sand barrel can be discharged by lowering the bailer shoe upon the derrick floor and opening the orifice provided in the shoe of the bailer.

In all the embodiments of this invention, there is a delay in starting the opening movement of the valve. This is desirable because it insures that the valve will not be opened prematurely. In the type of bailer shown in Figure 1, there is lost motion or a delay due to the fact that some time elapses after the shoe of the bailer strikes the well bottom before the head 93 strikes the block 14 to open the valve 7. In the type shown in Figure 6, the relative upward movement of the sleeve 43 does not lift the valve off its seat until the upper edge of the sleeve strikes the crosshead 53, thereby causing delay. In the type illustrated in Figure 9, the upper end of the coupling 119 must have a slight amount of travel before it strikes the collar 116 on the stem 109. This delays the opening of this valve.

Different conditions of fluid, fluid head, hardness of sand, straightness of hole and other conditions in the hole, together with the method of operating the bailer, determine to some extent the effectiveness of the bailer in operation.

In the operation of the bailer illustrated in Figure 6, when the shoe of the bailer strikes the bottom of the well, any fluid in the chamber that houses spring 45 will become compressed as the sleeve 43 with the shoe and sand chamber of the bailer move upwardly relative to the casing 38. The openings 63, of course, permit the escape of this fluid, but restrict its escape. In this way, the chamber of the spring 45 cooperates with the spring 45 in preventing the opening of the valve 48 if the bailer strikes a slight obstruction in the well before it reaches the bottom of the well.

In the type of bailer shown in Figure 9, it should be noted that when the bailer shoe strikes the bottom of the well, the spring 115 will be compressed and the downward movement of sleeve 121 is arrested. When this occurs, the upper end of the coupling 119 will not immediately engage the part 116 to stop the push rod 109 and open the valve 108. In this way, a slight delay occurs in opening the valve. This is advantageous because it insures that the shoe of the bailer will have a good "bite" in the sand before the valve opens. It also tends to prevent the valve from being opened prematurely in case an obstruction is encountered in the well above the bottom.

Although the chamber 10 is referred to in this specification as an air chamber, it should be understood that after the bailer has been operated, this chamber will contain gas from the well; the pressure of this gas in the air chamber will be slightly above atmospheric pressure and will be determined by the relief valves 27.

It is understood that the embodiment of the invention described herein is only one of the many embodiments this invention may take, and I do not wish to be limited in the practice of the invention, nor in the claims, to the particular embodiments set forth.

What I claim is:—

1. In a bailer, the combination of a casing having a sand chamber, with a bottom inlet, and a closed substantially air tight chamber, a valve mounted between the chambers for limited up and down movement independent of the sand chamber, automatic means for effecting a delayed movement of the valve toward its open position when the bailer lands on an obstruction in the well, means for retaining the valve open while resting on the obstruction, and means on the bailer for enabling the valve to be released after withdrawal from the mouth of the well.

2. In a bailer for deep wells under pressure, the combination of a casing having a sand chamber with a bottom inlet, valve means mounted for limited up and down movement at the upper end of the sand chamber, resilient means opposing the well pressure for exerting force on the valve means to hold the valve closed against pressure of fluid in the sand chamber under the well pressure while the bailer is being lowered into the well, means for effecting a delay in the moving of the valve means toward its open position after the bottom of the sand chamber has struck the well bottom to permit release of pressure from the sand chamber, and thereby effect the loading of the sand chamber with sand from the well through the action of the pressure existing in the well.

3. In a bailer for deep wells under pressure, the combination of a casing having a sand chamber with a bottom inlet, a valve mounted for limited up and down movement above the sand chamber, said casing having a transverse slot, a crosshead extending through the slot, a spring normally exerting its force in a direction to oppose the well pressure and hold the said valve against its seat to prevent the well pressure from opening the valve until the bailer strikes material to be bailed from the well, and means relatively movable upwardly on the bailer for engaging the crosshead to effect the opening of the valve to enable the pressure in the well to load the sand chamber with the material.

4. In a bailer for deep wells under pressure, the combination of a casing having a sand chamber with a bottom inlet, a valve independent of the bottom inlet with guiding means for the valve enabling the same to have limited up and down movement above the sand chamber, a spring exerting force on the valve for normally holding the valve closed, said valve operating to hold back the well pressure until the bailer strikes the material in the well, means for effecting the opening of the valve to release the liquid below the valve and enable the pressure in the well to effect the loading of the sand chamber from the wall, and automatic means for latching the valve in its open position.

5. In a bailer for bailing deep wells under pressure, the combination of a casing having a sand chamber with a bottom inlet, and having an air chamber above the sand chamber, a spring pressed valve between the sand chamber and the air chamber maintained normally in a closed position by its spring and while the bailer is being lowered into the well, said valve constructed to maintain itself closed against the liquid under the well pressure in the sand chamber until the bailer strikes material in the well, means for opening the valve thereafter to permit the flow of liquid under the well pressure from the sand chamber into the air chamber, means operating thereafter for positively maintaining said valve in its open position to enable the same to be released manually thereafter for returning the valve to its closed position.

6. In a bailer for bailing deep wells, the combination of a casing having a sand chamber with a bottom inlet and an air chamber above the same, a valve between the sand chamber and the pressure chamber, a coil spring for the valve, automatic means for opening the valve after the bailer strikes the well bottom and thereby causing an equalization of pressures in the sand chamber and the pressure chamber and thereby reducing the pressure in the sand chamber to cause the injection of the bailed material into the sand chamber from the well, means to retain said material in the sand chamber, means for maintaining the valve in its open position, and manually operated means operating thereafter to open the sand chamber at the mouth of the well to cause the ejection under pressure of the bailer material.

7. In a sand bailer, the combination of a bailer suspension, a tube section with a self-contained flow control valve carried thereon and operating to form an air chamber, above the valve, means above the valve capable of regulation to control the area of flow upwardly to the air chamber, a tube section attached to the lower end of the first-named tube section to form a sand chamber, and a bottom bailer valve carried on the lower end of the last-named tube section.

8. In a bailer, the combination of a casing with telescoping parts, said casing having an air chamber toward its upper end and having a sand chamber at its lower end with a bottom inlet, a valve seat located between the sand chamber and the air chamber, a valve mounted above the seat so as to close by a downward movement onto the seat, a coil spring associated with the valve opposing the well pressure and maintaining the valve normally in a closed position, means for engaging the valve to move the valve off its seat to an open position actuated by the telescoping action of the bailer when the weight of the bailer is supported on its lower end, and means for regulating the force of the said spring to enable the valve to remain closed against different well pressures.

9. In a bailer, the combination of a casing, a valve within the casing, a sand chamber below the valve, a pressure chamber above the valve, said casing having a plurality of ducts for fluid flow located between the sand chamber and the pressure chamber, and means for closing off one or more of the ducts to restrict or increase the area of flow for the fluid passing to the pressure chamber.

10. In a bailer, the combination of a casing with telescoping parts, said casing having an air chamber toward its upper end and having a sand chamber at its lower end with a bottom inlet, a valve seat located between the sand chamber and the air chamber, a valve mounted above the seat so as to close by a downward movement onto the seat, a coil spring associated with the valve opposing the well pressure and maintaining the valve normally in a closed position, means for engaging the valve to move the valve off its seat to an open position actuated by the telescoping action of the bailer when the weight of the bailer is supported on its lower end, means for regulating the force of the said spring to enable the valve to remain closed against different well pressures, and a spring associated with the telescoping bailer parts and exerting its force in the direction to hold the telescoping sections in their extended relation.

11. In a bailer for deep wells, the combination of a casing having a sand chamber with a bottom inlet, a valve seat, a valve located above the sand chamber, a coil spring opposing the well pressure and normally holding said valve pressed against its seat and operating to prevent the well pressure from opening the valve, means for guiding the said chamber on the casing to permit a relative upward movement of the same on the casing, means for normally holding the sand chamber in an extreme low position so that a relatively upward movement of the sand chamber on the bailer takes place when the bailer strikes the material to be bailed in the well, means actuated through the said relatively upward movement to move the valve off its seat, thereby releasing the pressure in the upper end of the sand chamber to effect the loading of the sand chamber through the said bottom inlet by the action of the pressure in the well.

12. In a bailer for deep wells, the combination of a casing having a sand chamber with a bottom inlet, a valve located above the sand chamber, a coil spring opposing the well pressure and normally holding said valve closed and operating to prevent the well pressure from opening the valve, means for guiding the sand chamber for relative sliding movement on the casing, a sleeve carried by the sand chamber to move upwardly therewith relatively to the casing, a crosshead mounted in the casing under the spring and engaged by the upper end of the sleeve when the same moves relatively upwardly to open the valve and thereby release the fluid pressure at the upper end of the sand chamber to effect the loading of the sand chamber under the action of the pressure existing in the well.

13. In a bailer for deep wells, the combination of a casing having a sand chamber with a bottom inlet, a valve located above the sand chamber, a coil spring opposing the well pressure and normally holding said valve closed and operating to prevent the well pressure from opening the valve, means for guiding the sand chamber for relative sliding movement on the casing, a sleeve carried by the sand chamber to move upwardly therewith relatively to the casing, a crosshead connected with the valve mounted on the casing and engaged by the upper end of the sleeve when the same moves relatively upwardly on the casing to open the valve and thereby release the fluid under pressure at the upper end of the sand chamber to effect the loading of the sand chamber under the action of the pressure existing in the well, said casing having a bore above the valve with a plunger connected with the valve and guided therein, and means for exposing the upper side of the plunger to the well pressure to balance the pressure on the valve.

14. In a bailer for bailing deep wells under pressure, the combination of a casing having a sand chamber with a bottom inlet, an air chamber and a flow control valve between said chambers to permit or prevent the flow of fluid from one chamber to the other, said flow control valve comprising a valve and valve seat, said valve having a stem with a piston, said casing having a bore for housing the piston in the casing, so that its end face lies within the casing and is exposed to the well pressure to balance the valve, a spring opposing the pressure at the well bottom for normally holding the valve on its seat and preventing the valve from being opened by the well pressure, said casing having passage means in the same to pass fluid from below up past the piston, to permit the flow of liquid from the sand chamber to the air chamber when the valve is opened by the bailer striking the bottom of the well.

15. In a bailer for bailing deep wells under pressure, the combination of a casing having a sand chamber with a bottom inlet, an air chamber with a flow control valve located between said chamber to permit or prevent the flow of fluid from one chamber to the other, said flow control valve comprising a valve and a valve seat, said valve having a stem with a piston, said casing having a bore for housing the piston in the casing so that its end face lies within the casing and is exposed to the well pressure to balance the valve, a spring for the valve opposing the pressure at the well bottom normally holding the valve on its seat and preventing the well pressure from opening the valve, said casing having passage means in the same to pass fluid from below upwardly past the piston to permit the flow of liquid from the sand chamber to the air chamber, means for effecting the opening of the valve when the lower end of the bailer strikes the material to be bailed, and means for regulating the effective area of flow through the said passage means and thereby controlling the speed of flow of material from one of said chambers to the other.

16. In a bailer for bailing deep wells under pressure, the combination of a casing having a sand chamber with a bottom inlet, an air chamber with a flow control valve located between said chambers to permit or prevent the flow of fluid from one chamber to the other, said flow control valve comprising a valve and a valve seat, said valve having a stem with a piston, said casing having a bore for housing the piston in the casing so that its end face lies within the casing and is exposed to the well pressure to balance the valve, a spring for the valve opposing the pressure at the well bottom normally holding the valve on its seat and preventing the well pressure from opening the valve, said casing having passage means in the same to pass fluid from below upwardly past the piston to permit the flow of liquid from the sand chamber to the air chamber, means for effecting the opening of the valve when the lower end of the bailer strikes the material to be bailed, means for regulating the effective area of flow through the said passage means and thereby controlling the speed of flow of material from one of said chambers to the other, a relief valve in the upper end of the air chamber for automatically reducing excess pressure in the air chamber, and a tube extending downwardly from the relief valve through a portion of the air chamber, said tube serving to trap gas in the upper part of the pressure chamber and operating to convey liquid from the pressure chamber up through the said relief valve.

17. In a bailer, the combination of means at the upper end of the bailer for suspending the same, said bailer having a casing including an upper tube section, a self-contained flow control valve mounted in the upper tube section, said upper tube section having a chamber above the valve and said casing having a transverse wall above said valve, said casing including a lower tube section with a sand chamber connected to the upper tube section, a bottom bailer valve carried in the lower tube section, said transverse wall of the upper tube section having a plurality of flow control ducts accessible at the lower end of the upper tube section to enable one or more of the said ducts to be plugged at will to regulate the effective area of flow for liquid passing upwardly through said transverse wall from said sand chamber.

18. In a bailer for deep wells, the combination of a casing having a sand chamber below with a bottom inlet, and having a closed substantially air-tight air chamber above the sand chamber for holding air at atmospheric pressure, a valve seat, a valve mounted between the chambers for limited up and down movement, said valve constructed and mounted so that it maintains itself pressed against its seat while the bailer is descending in the well, thereby maintaining atmospheric pressure in the air chamber and preventing the well pressure from unseating the valve, means for effecting a delayed movement of the valve away from its seat when the bailer arrives at the sand in the well to enable the liquid under pressure in the sand chamber below the valve to pass upwardly into the air chamber, and effect the charging of the sand chamber with sand from the well.

19. In a bailer for deep wells under pressure, the combination of a casing, a sleeve having a limited vertical movement relative to the casing and having means for connecting the same to the shoe of the bailer, a valve in the casing, means located under the valve and connected with the sleeve for engaging the valve to enable the upward movement of the sleeve relative to the casing to open the valve, there being a bore with a balancing piston above the valve, said balancing piston having its upper face located within the casing, means connecting the balancing piston with the valve, and means for admitting the well pressure to the upper side of the piston.

20. In a bailer for deep wells under pressure, the combination of a casing, a sleeve having a limited vertical movement relative to the casing and having means for connecting the same to the shoe of the bailer, a valve in the casing, means located under the valve and at a distance from the valve and connected with the sleeve for engaging the valve to enable the upward movement of the sleeve relative to the casing to open the valve after the shoe has been given a portion of its relative upward movement, there being a bore with a balancing piston above the valve, the upper face of the said piston being located within the casing, means connecting the piston with the valve, and means for admitting the well pressure to the upper side of the piston.

21. In a bailer for deep wells under pressure, the combination of a casing, a sleeve having a limited vertical movement relative to the casing and having means for connecting the same to the shoe of the bailer, a valve in the casing, means located under the valve and at a distance from the valve and connected with the sleeve for engaging the valve to enable the upward movement of the sleeve relative to the casing to open the valve after the shoe has been given a portion of its relative upward movement, there being a bore with a balancing piston above the valve, the upper face of the said piston being located within the casing, means connecting the piston with the valve, means for admitting the well pressure to the upper side of the piston, and a spring for resisting the upward movement of the sleeve and the shoe.

22. In apparatus of the kind described for use in a deep well, the combination of a casing having means for securing the same to a tool string, a valve guided to slide within the casing, a balancing piston associated with the valve, said casing having a bore in which the piston is guided, means for closing the bore above the piston, a spring for normally holding the valve closed, said casing having means for admitting the well pressure to the said bore above the piston for counter-balancing the said valve, and a relatively movable bailer shoe with means for opening the valve.

23. In apparatus of the kind described for use in a deep well, the combination of a casing having means for securing the same to a tool string, a valve guided to slide within the casing, a balancing piston attached to the valve, said casing having a bore in which the piston is guided, means for closing the bore above the piston, a spring for normally holding the valve closed, said casing having a transverse slot through its wall communicating with the said bore for admitting the well pressure to the end of the balancing piston, a crosshead connected with the piston and movable longitudinally in the slot when the valve opens, and a relatively movable bailer shoe mounted on the casing and having means for engaging the crosshead to open the valve.

24. In a bailer, the combination of a casing having a sand chamber, with a bottom inlet, and a closed substantially air-tight chamber, a valve mounted between the chambers for limited up and down movement independent of the sand chamber, and automatic means for effecting a delayed movement of the valve toward its open position when the bailer lands on an obstruction in the well.

25. In a bailer, the combination of a casing with telescoping parts, said casing having an air chamber toward its upper end and having a sand chamber at its lower end with a bottom inlet, a valve seat located between the sand chamber and the air chamber, a valve mounted above the seat so as to close by a downward movement onto the seat, a coil spring associated with the valve opposing the well pressure and maintaining the valve normally in a closed position, a shoe at the lower end of the sand chamber, means moved by said shoe for engaging the valve to open the same, and a spring associated with the shoe for resisting relative upward movement of the shoe when the same strikes an obstruction in the well.

26. In a bailer, the combination of a casing having a sand chamber, with a bottom inlet, a closed substantially airtight chamber, and a valve seat between the chambers, a valve for said seat mounted for limited up and down movement below the same and independent of the sand chamber, and automatic means for effecting a delayed movement of the valve toward its open position when the bailer lands on an obstruction in the well.

27. In a bailer, the combination of a casing having a sand chamber, with a bottom inlet, a closed substantially airtight chamber, and a valve seat between the chambers, a valve for said seat mounted for limited up and down movement below the same and independent of the sand chamber, and automatic means for effecting a delayed and subsequently a relatively rapid movement of the valve toward its open position when the bailer lands on an obstruction in the well.

28. In a well tool, a casing having a sand chamber and a suction chamber, a closure between said chambers, and means operable by momentum accumulated during the descent of said tool into the well to open said closure when the downward movement of the well tool is arrested.

29. In a well tool, a casing having a sand chamber and a suction chamber, a closure between said chambers, and means within the casing operable by momentum accumulated during the descent of said tool into the well to open said closure when the downward movement of the well tool is arrested.

30. In a well tool, a casing having a sand chamber and a suction chamber, a closure between said chambers, and means within the casing and above the closure operable by momentum accumulated during the descent of said tool into the well to open said closure when the downward movement of the well tool is arrested.

31. In a well tool, a casing having an upper chamber and a lower chamber, a valve closure therebetween, said valve being positioned in the lower chamber and movable therein, means above the valve to maintain the same normally closed, and means operable by momentum accumulated during the descent of said tool into the well to open said valve when the downward movement of the well tool is arrested.

32. In a well tool, a casing having an upper chamber and a lower chamber, a valve closure therebetween, said valve being positioned in the lower chamber and movable therein, means in the upper chamber to maintain the valve normally closed, and means operable by momentum accumulated during the descent of said tool into the well to open said valve when the downward movement of the well tool is arrested.

33. In a well tool, a casing having an upper chamber and a lower chamber, a valve closure therebetween, said valve being positioned in the lower chamber and movable therein, resilient means in the upper chamber to maintain the valve normally closed, and means operable by momentum accumulated during the descent of said tool into the well to open said valve when the downward movement of the well tool is arrested.

34. In a well tool, a casing having an upper chamber and a lower chamber, a valve closure therebetween, said valve being positioned in the lower chamber and movable therein, a spring in the upper chamber to maintain the valve normally closed, and means operable by momentum accumulated during the descent of said tool into the well to open said valve when the downward movement of the well tool is arrested.

35. In a well tool, a casing having a sand chamber and a suction chamber, a closure between said chambers, means operable by momentum accumulated during the descent of said tool into the well to open the closure when the downward movement of the well tool is arrested, and means to maintain said closure in open position.

36. In a well tool, a casing having a sand chamber and a suction chamber, a closure between said chambers, means operable by momentum accumulated during the descent of said tool into the well to open the closure when the downward movement of the well tool is arrested, and latching means to maintain said closure in open position.

37. In a well tool, a casing having a sand chamber and a suction chamber, a normally closed valve between said chambers, latching means to lock said valve when open, and means for opening the valve and actuating the latching means.

38. A bailer having a suction chamber and a sand chamber with a passage connecting the same, a valve seat for said passage, a valve received on said seat from below, means for normally holding the valve on its seat, means for opening said valve, and a latching block adapted to move downwardly to lock the valve when open.

39. A bailer having a sand chamber at its lower end and an upper chamber above the sand chamber with a passage connecting the same, a valve seat for said passage, a valve closure mounted to come upon the valve seat from below, means for holding the valve closure on its seat while the bailer is descending in the well, and means operable by momentum accumulated during the descent of the bailer into the well for opening said valve.

40. A bailer having a sand chamber at its lower end and an upper chamber above the sand chamber with a passage connecting the same, a valve seat for said passage, a weighted valve closure mounted to come upon the valve seat from below, means for holding the valve closure on its seat while the bailer is descending in the well, said valve being adapted to open by its momentum accumulated during the descent of the bailer into the well when the bailer is arrested and automatic means for latching the valve in its open position.

41. A bailer having a sand chamber at its lower end and a suction chamber above the sand chamber with a passage connecting the same, a valve seat for said passage, a valve closure received on said seat from below, said valve closure having a guide of substantial weight attached thereto and capable of moving downwardly in the bailer when the motion of the bailer is arrested, a spring for normally holding the valve closure on its seat, said valve being adapted to open by the momentum accumulated by the guide during the descent of the bailer into the well when the bailer is arrested, and automatic means for latching the valve in its open position.

42. A bailer having a sand chamber at its lower end and an air chamber above the sand chamber with a passage connecting the same, a valve seat for said passage, a valve closure received on said seat from below, said valve closure having a guide of substantial weight attached thereto and capable of moving downwardly in the bailer when the motion of the bailer is arrested, a spring for normally holding the valve closure on its seat, a movable latching block, said valve being adapted to open by the continued downward motion of the valve guide and latching block after the bailer is arrested due to the momentum accumulated by the same during the descent of the bailer into the well, a latch bolt mounted to slide in the latching block, the wall of said bailer having a cam face for sliding the latch bolt when the latching block moves relatively downward under its own momentum, and a shoulder for engaging the end of the latch bolt to latch the latching block in a depressed position and hold the valve open.

43. A bailer having an outer sleeve, a sand chamber at the lower end of the bailer, an air chamber above the sand chamber within the bailer with a passage connecting the same, a valve seat for said passage, a valve closure received on said seat from below, said valve closure having a guide of substantial weight attached thereto and capable of moving downwardly in the bailer when the downward motion of the bailer is arrested, a spring for normally holding the valve closure on its seat, a movable latching block, said valve being adapted to open by the continued downward motion of the guide and latching block after the bailer is arrested due to the momentum accumulated by the same during the descent of the bailer into the well, a latch bolt guided to slide transversely in the latching block, said bailer having a sleeve with a cam face for engaging the latch bolt when the latching block descends by its own momentum and operating to project the latch bolt outwardly, said last-named sleeve having a shoulder to cooperate with the projected latch bolt to latch the valve closure in its open position, said outer sleeve having an opening in the wall thereof opposite the latch bolt and adjacent said shoulder to enable the latch bolt to be released from the exterior of the bailer.

44. A bailer having an outer sleeve, a sand chamber at the lower end of the bailer and an air chamber above the sand chamber within the bailer with a passage connecting the same, a valve seat for said passage, a valve closure received on said seat from below, said valve closure having a guide of substantial weight attached thereto and capable of moving downwardly in the bailer when the downward motion of the bailer is arrested, a spring for normally holding the valve closure on its seat, a movable latching block, said valve being adapted to open by the continued downward motion of the guide and latching block after the bailer is arrested due to the momentum accumulated by the same during the descent of the bailer into the well, a latch bolt guided to slide transversely in the latching block, said bailer having a sleeve with a cam face for engaging the latch bolt when the latching block descends by its own momentum and operating to project the latch bolt outwardly, said last-named sleeve having a shoulder to cooperate with the projecting latch bolt to latch the valve closure in its open position, said outer sleeve having an opening in the wall thereof opposite the end of the latch bolt and adjacent said shoulder to enable the latch bolt to be released from the exterior of the bailer, and means for closing said last-named opening to prevent escape of liquid under pressure in the sand chamber.

45. In a suction bailer, the combination of a casing having a substantially air-tight suction chamber, closure means for excluding the well pressure from the suction chamber when the bailer is descending in the well, and means mounted in the casing for upward movement relative to the casing brought into action when descent of the bailer is arrested for effecting delayed opening of said closure means to open communication to the suction chamber to charge the bailer, and means for retaining the charge in the bailer.

46. In a suction bailer, the combination of a casing having a substantially air-tight suction chamber, closure means for excluding the well pressure from the suction chamber when the bailer is descending in the well, and means mounted in the casing for downward movement relative to the casing brought into action when descent of the bailer is arrested for effecting delayed opening of said closure means to open communication to the suction chamber to charge the bailer, and means for retaining the charge in the bailer.

47. In a suction bailer, the combination of a casing having a substantially air-tight suction chamber, a shoe in the form of a rigid sleeve mounted to slide up and down on the casing, closure means for excluding the well pressure from the suction chamber when the bailer is descending in the well, and means for effecting a delayed movement of said closure means brought into action by the relative upward movement of the shoe when it strikes the well bottom, to open communication to the suction chamber to charge the bailer, and means for retaining the charge in the bailer.

48. In a suction bailer, the combination of a casing having a suction chamber, a shoe in the form of a rigid sleeve mounted to slide up and down on the casing and having an intake mouth at its lower end coaxial with the sleeve, closure means for excluding the well pressure from the suction chamber when the bailer is descending in the well, and means for effecting a delayed movement of said closure means by the relative upward movement of the shoe when it strikes the well bottom, to open communication to the suction chamber to charge the bailer, and means for retaining the charge in the bailer.

49. In a tool for cleaning out wells under pressure, the combination of a casing having an air chamber sealed against the pressure of the well, with a port below the same, closure means for the port, and port-opening means having delayed action for effecting a delayed opening of said port closure means.

50. In a tool for cleaning out wells under pressure, the combination of a casing having an air chamber sealed against the pressure of the well, a sand chamber below the air chamber with a port between the chambers, closure means for the port, and port-opening means having delayed action for effecting the delayed opening of said closure means brought into action by the striking of the lower end of the tool against the well bottom.

51. In a tool for cleaning out wells under pressure, the combination of a casing having an air chamber sealed against the pressure of the well with a port below the same, a sand chamber mounted below said air chamber, said port constituting a fluid way between said air chamber and said sand chamber, closure means for said port, and a part mounted for vertical movement on the tool and actuated by the tool's striking the well bottom, for striking the closure means to open said port.

52. In a suction bailer, the combination of a casing having an air chamber in the upper end thereof, a relief valve at the upper end of the casing, and a tube communicating with the relief valve and extending down into the air chamber and forming an air pocket in the air chamber above the lower end of the tube.

53. In a well tool, the combination of a casing having a sand chamber and a closed substantially airtight chamber, a valve seat between said chambers, a valve, said valve seat and said valve being mounted for simultaneous movement when the tool is arrested, and means for opening said valve subsequent to the simultaneous movement of said valve seat and said valve.

54. In a well tool, a casing having a suction chamber, a sand chamber and a bottom inlet, a valve between said chambers, means to maintain said valve normally closed, means for opening said valve, and means to retard opening of the valve when descent of the well tool is arrested.

55. In a well tool, a casing having a suction chamber, a sand chamber and a bottom inlet, a valve between said chambers, means to maintain said valve normally closed, means for opening said valve, and resilient means to retard opening of the valve when descent of the well tool is arrested.

56. In a well tool, a casing having an upper chamber, a lower chamber and a bottom inlet, a valve between said chambers, a spring to maintain said valve normally closed, means for opening said valve when descent of the well tool is arrested, and a second spring to retard opening of said valve.

57. In a well tool, a casing having communicating chambers, a fluid way between said chambers, a closure for said fluid way, means for retaining said closure in closed condition as the tool is being lowered into the well, and means operable by momentum accumulated during the descent of the tool into the well to open said closure when the downward movement of the tool is arrested.

58. In a well tool, a sand chamber, a suction chamber, a fluid way between said chambers, a valve for closing said way, means for opening said valve, and means for locking said valve in open position.

59. In a well tool, a sand chamber, a suction chamber, a fluid way between said chambers, a valve for closing said way, means for maintaining said valve in closed position as the tool is being lowered into the well, means for opening said valve when the lowering of the tool is arrested, and means for locking said valve in open position.

60. A bailer having a sand chamber at its lower end and an upper chamber above the sand chamber with a passage connecting the same, a valve seat for said passage, a weighted valve closure mounted to come upon the valve seat from below, means for holding the valve closure on its seat while the bailer is descending in the well, said valve being adapted to open by its own momentum accumulated during the descent of the bailer in the well when the bailer is arrested.

61. A bailer having a sand chamber at its lower end and a suction chamber above the sand chamber with a passage connecting the same, a valve seat for said passage, a valve closure received on said seat from below, said valve closure having a guide of substantial weight attached thereto and capable of moving downwardly in the bailer when the motion of the bailer is arrested, a spring for normally holding the valve closure on its seat, said valve being adapted to open by the momentum accumulated by the guide during the descent of the bailer in the well when the bailer is arrested.

62. In a well tool, the combination of a casing having a sand chamber and a closed substantially airtight chamber, a valve structure for separating said chambers, said structure comprising a pair of cooperating valve members mounted for simultaneous movement when the tool is arrested in the well, and means for checking the movement of one of said valve members subsequent to said simultaneous movement and opening said valve between said chambers.

63. In a well tool, the combination of a casing having a sand chamber and a closed substantially airtight chamber, a valve structure for separating said chambers, said structure comprising a pair of cooperating valve members mounted for simultaneous downward movement when the tool is arrested in the well, and means for checking the downward movement of one of said valve members subsequent to said simultaneous movement and opening the valve between said chambers.

OMAR A. CAVINS.